United States Patent [19]
Reynier et al.

[11] 3,960,599
[45] June 1, 1976

[54] BUTTON TYPE CELL AND BATTERY

[75] Inventors: Jacques Reynier, Eymet; Michel Gugliér, Bassens, both of France

[73] Assignee: SAFT-Societe des Accumulateurs Fixes et de Traction, Romainville, France

[22] Filed: Feb. 6, 1975

[21] Appl. No.: 547,443

Related U.S. Application Data
[63] Continuation of Ser. No. 386,438, Aug. 7, 1973, abandoned.

[30] Foreign Application Priority Data
Aug. 10, 1972  France .............................. 72.28941

[52] U.S. Cl. ................................ 136/111; 136/175
[51] Int. Cl.² ........................................ H01M 31/00
[58] Field of Search ............... 136/111, 134 R, 107, 136/175, 108, 109

[56] References Cited
UNITED STATES PATENTS

| | | |
|---|---|---|
| 2,590,824 | 3/1952 | Roehrl .............................. 136/133 |
| 2,620,369 | 12/1952 | Daniel ................................ 136/111 |
| 2,723,301 | 11/1955 | West, Jr. et al ..................... 136/107 |
| 2,775,534 | 12/1956 | Herbert .............................. 136/139 |

Primary Examiner—Anthony Skapars
Attorney, Agent, or Firm—Kenyon & Kenyon Reilly Carr & Chapin

[57] ABSTRACT

Electro-chemical generators of the button type in which a stack of alternate positive and negative electrodes with separators between electrodes of opposite polarity are enclosed between two collectors which serve as terminals of opposite polarity for the generator. The assembly of electrodes, separators and collectors together with requisite electrolyte are held together by a molded insulative plastic frame which has portions overlying the peripheries of the collectors and which also may penetrate to a limited extent in the space between the peripheries of the collectors as by an insulative body encircling the electrode separator assembly. This body may be an electrically insulative ring, or an elastomer seal member.

6 Claims, 4 Drawing Figures

3,960,599

BUTTON TYPE CELL AND BATTERY

RELATED APPLICATIONS

This is a continuation of application Ser. No. 386,438 filed Aug. 7, 1973, now abandoned.

BACKGROUND AND SUMMARY OF THE INVENTION

The present invention relates primarily to so-called button-type electro-chemical generators.

Such generators commprise positive and negative electrodes enclosed between two collectors which form the generator terminals and which are fitted together and joined but insulated from each other as by means of an electrically insulative seal, thus forming a sealed casing. British Patent No. 561,820 describes such generators, which are in widespread use due to their small bulk.

The assembly of electrodes necessary separators and electrolyte are sometimes enclosed in sealed casings, generally of circular form, comprising metal shells, one of which serves as a metal base member and the other as a metal cover member, one of which shells is deeply engaged in the other. These shells are appropriately held together but are separated electrically by an insulative seal. Such generators must be made with great care. Faulty positioning of the seal between the two metal shells or too great or too small a compression in fitting the one shell into the other incurs the risk of deterioration or deformation of the seal, with consequent leakage of electrolyte and shortcircuits.

The present invention comprises a button-type electrochemical generator, comprising positive and negative electrodes enclosed between two collectors whose peripheral edges are spaced and which respectively form the negative and positive generator terminals and a moulded electrically insulative plastics frame forming with the collectors a sealed casing, portions of the frame overlying the peripheral portions of the collectors to hold the components of the generator together.

The insulative material of the frame may be allowed to penetrate during moulding into the space between the spaced-apart edges of the two collectors. To limit the depth of such penetation, however, it is advantageous to provide stop means in the form of an electrically insulative ring which encircles the assembly of collectors, electrodes and separators.

Alternatively, an elastomeric insulative seal member may be interposed between the peripheral edges of the two collectors, thus serving also as such stop means.

In a preferred embodiment, the two collectors are cup-shaped and with open ends which face inwardly so that the peripheral edges of the collectors lie between the planes of the outermost collector surfaces, the height of the frame being less than or equal to the distance between these planes. As a consequence, a group of such generators can be stacked to form a battery with the adjoining flat surfaces of adjoining collectors of opposite polarity providing direct electrical contact between adjacent generators.

Alternatively, where the frame extends beyond these planes, at least one of the collectors of each generator or both may be formed with central bosses to ensure electrical contact between adjacent generators when they are stacked into a battery.

To construct a battery with such generators, the metallic surfaces of the appropriate ones of the collectors of adjacent generators may be welded together. This welding is preferably carried out before assembling the component parts of each generator.

Objects and features of the invention are the provision of electrochemical generators and batteries of such generators whose structure insures effective sealing of the cells without risk of mislocation or damage of requisite insulative seal means between collectors of opposite polarity.

Other objects and features are simplicity of assembly with consequent reduction in manufacturing costs.

Other objects and features of the invention will become apparent from the following detailed description and the accompanying drawing showing by way of example only different forms of the invention and wherein:

FIGS. 1, 2 and 3 show three different embodiments of electrochemical generators each embodying the invention, said figures being sections on diameters of the respective generators; and FIG. 4 shows in similar section a part of a battery comprising a stack of such generators.

DETAILED DESCRIPTION

Figure 1:
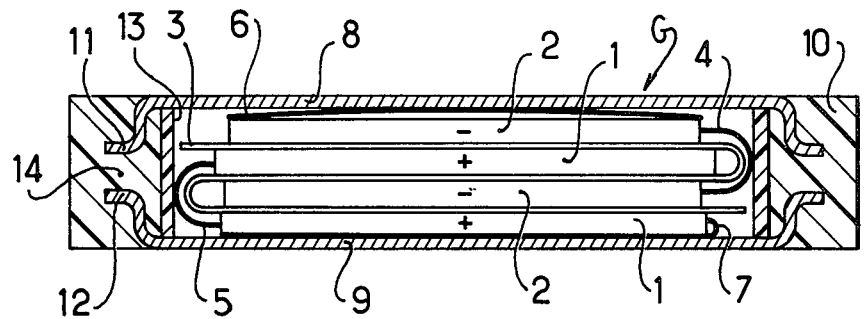

Referring to FIG. 1, the electrochemical generator G, which is shown in section on a diameter, comprises alternately disposed positive plates 1 and negative plates 2 separated by separator sheet 3. The plates of the same polarity are electrically connected by respective bridges 4 and 5 and one of the end plates, preferably the positive one, is provided with a metal tape 7 which is welded against the corresponding collector 9. A spring 6 is disposed between the other end plate 2 (negative in this example) and the inner face of collector 8.

The laminated structure or stacked assembly of electrode plates and separators is impregnated with an alkaline electrolyte and enclosed in a sealed casing consisting of the respective collectors 8 and 9, which cover the outermost surfaces of the stacked assembly, and a molded electrically insulative plastic frame 10 molded around and over the peripheral rims or edges 11 and 12 of the cllectors 8 and 9 respectively. To limit penetration during molding of the material of the frame 10 between the collectors 8 and 9 and electrically insulative tubular body or ring or member 13 which is resistant to attack by the electrolyte surrounds the stack of plates and separator. The width or height of this body 13 defines the internal height of generator G and the dimensions of the distance 14 between the rims 11 and 12.

The collectors 8 and 9 are identical, and are cup-shaped and arranged so that their open ends face inwardly. The rims or edges 11 and 12 of these collectors thus lie between the planes of the outermost collector surfaces and the distance 14 between the edges is significantly less than the height of the stack of component parts of the generator. The height of the molded frame 10 can be equal to or less than the height of this stack. The frame 10 provides electrical insulation between the collectors 8 and 9, sealing against leakage of electrolyte in the generator, the mechanical assembly of the generator and also serves as a protective cover for the generator.

Figure 2:
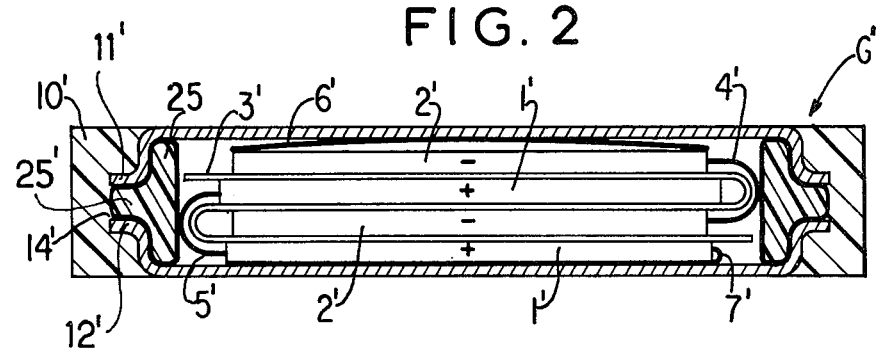

The generator G' of FIG. 2 differs from that of FIG. 1 in that instead of tubular body or ring 13, a seal 25 is positioned internally of the collectors 8' and 9' and has a nose portion 25' which extends into the space 14'.

The seal may be of an elastomeric material and may extend around the stack of components 1', 2', 3', 4', 5', 6' and 7' of the generator to take the place of the ring 13 shown in FIG. 1. The frame 10' is of the same material as frame 10 and is molded around and over the peripheral edges or rims 11' and 12'. This frame 10' serves the same function as frame 10. The components 1', 2', 3', 4', 5', 6', 7' and 8' are identical with the numbered umprimed components in FIG. 1.

Figure 3:
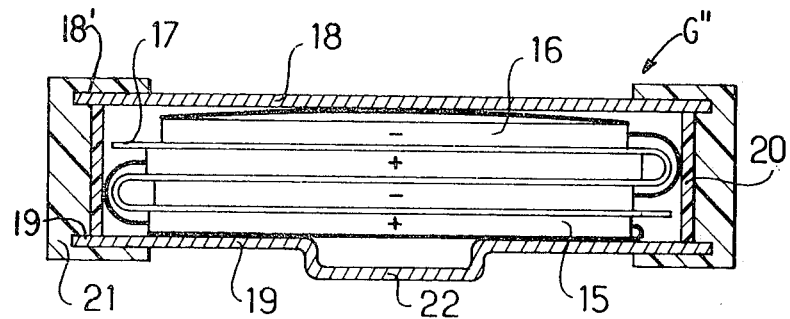

The generator G'' shown in FIG. 3 includes a stack of positive plates 15, negative plates 16 and a separator sheet 17 between adjacent plates with metallic collectors 18 and 19 applied against the extreme faces of the stack. A ring 20 encircles the stack and extends between the collectors 18 and 19. It is of an electrically insulative material. An electrically insulative frame 21 is molded around the assembled stack so that its edges 21a and 21b respectively overlie the edge portions of the collctors 18 and 19 to provide the mechanical maintenance assembly of the components of the generator. It is noted, too, that edge or rim portions 18' and 19' of the collectors are embedded in the frame 21.

This generator G'' differs from those shown in FIGS. 1 and 2 in that the collctors 18 and 19 are generally flat, rather than cup-shaped. As a result, the overall height of the molded frame 21 must be and is greater than the distance between the planes of the outermost collector surfaces, but on the other hand the lateral bulk of this generator G'', for the same geometry of stacked component parts, is less than that of the generators of FIG. 1 or FIG. 2.

As the frame 21 has a height which extends the distance between the planes of the outermost collector surfaces, to enable generators such as that shown in FIG. 3 to be stacked to form batteries requires the provision of a boss on at least one of the collectors. Thus, FIG. 3 shows a central boss 22 on the collector 19, this boss has a height so that it projects sufficiently far from the remainder of the collector 19 that in a stacked array of such generators it will make contact electrically with the collector 18 of the adjacent underlying generator.

Electrochemical generators have been constructed in accordance with the embodiment of FIG. 1 with a capacity of 100 mAh, with a distance between the outermost collector surfaces of 5 millimetres and a diameter of 26.4 millimetres. The collectors 8 and 9 were of nickel-plated steel, the ring 13 of polyethylene, and the frame 10 of acrylonitrile/butadiene/styrene polymers. The materials of corresponding components of the generators G' and G'' were like those of generator G.

Figure 4:
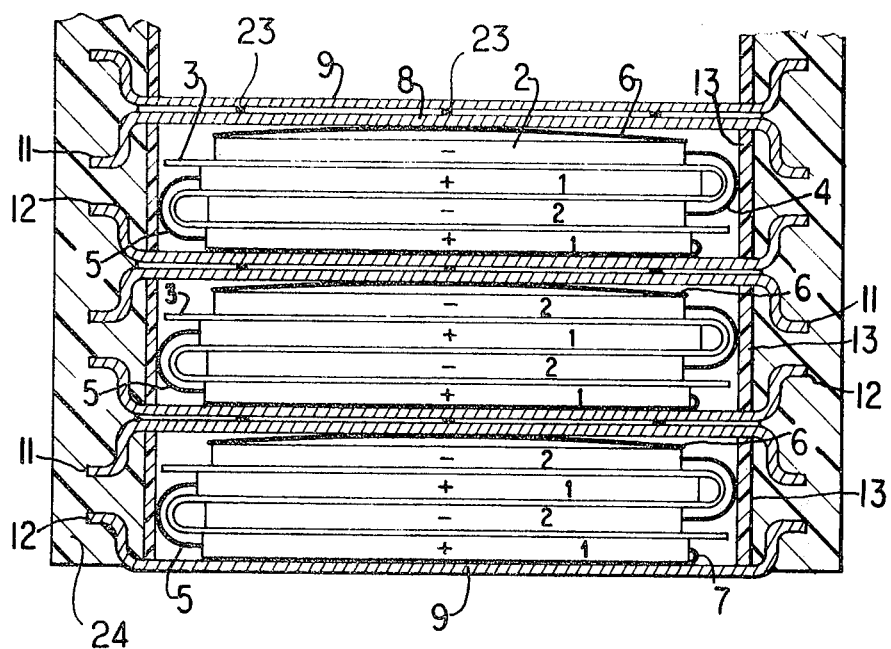

FIG. 4 shows a battery consisting of a stack of several generators G of the type shown in FIG. 1. To improve the mechanical stability of the assembly and the electrical connection between adjacent generators the contacting collectors of adjacent generators are welded together, as indicated at 23. To simplify the construction of such a battery, the adjoining collectors 8 and 9 are welded together two-by-two before placing the components parts (electrodes 1 and 2 and separators 3) of each generator between collectors 8 and 9. A single molded frame 24 of plastic material is provided for the entire stack of generator G, in a single molding operation instead of individual frames 10.

It will be appreciated that generators such as those just described can be produced in any practical shape, which will enable maximum usage of the space available inside electronic equipment with which such generators are to be used. Whilst such generators are generally circular, generators embodying the invention and having a square or triangular outline, or any other suitable form may be provided for special applications, merely by changing the shapes of the electrodes, separators and collectors.

The separate flat electrodes and separators can be replaced by thin tapes wound helically around an axis perpendicular or parallel to the collectors.

It will be appreciated that the symmetrical generator structures described can be replaced by asymmetrical structures. For example, one collector may be cup-shaped as shown in FIGS. 1 and 2 and the outer flat as shown in FIG. 3, and either or both may be provided with a central boss like boss 22.

The frames 10, 10', 21 and 24 may be made of other plastic materials, such as polyamide or polyethylene, preferably of high density, or polypropylene or glass fibre. The ring 13 may be of neoprene elastomers.

While specific embodiments of the invention have been described and shown, variations in structural detail within the scope of the appended claims are possible and are contemplated. There is no intention of limitation to the exact disclosure herein made.

What we claim is:

1. A method of manufacturing an electrochemical cell comprising providing a stack of alternately disposed positive plates and negative plates separated by separator sheets, surrounding said stack by an insulative ring, electrically linking the endmost plates of opposite polarity to a pair of collectors disposed respectively at each end of the stack, impregnating the said stack with an electrolyte and then molding an electrically insulative plastic material in form of a frame around and over the peripheral rims of the collectors, said ring limiting the penetration of the said material during molding to prevent it from reaching said stack.

2. A method according to claim 1 wherein the electrical linking comprises welding the end plate of one polarity to a first of said collectors and of disposing a spring between the end plate of the other polarity and the second of said collectors.

3. A method according to claim 1 wherein the said collectors are each cup-shaped and disposed so that their open ends face inwardly.

4. A method according to claim 1 wherein the said collectors are generally flat shaped, one of them being provided with an outwardly projecting boss.

5. A method according to claim 1 wherein the said ring is made of an elastomeric material and is provided with a portion extending between the collector rims.

6. A method of manufacturing a battery of superposed electrochemical cells comprising uniting pairs of collectors for respective adjacent cells, assembling cell stacks each comprising positive electrodes, negative electrodes, interposed separator sheets and electrolyte impregnant, surrounding each such cell stack with an insulative annular member, positioning one of such cell stacks on a collector, covering the so-positioned one of said cell stacks with one of the collectors of a said united pair of collectors, positioning a second of said cell stacks also surrounded by a said annular member on a second of the collectors of said united pair of collectors, covering the sopositioned second of said cell stacks with another collector and thereafter molding a single frame of plastic material around the assembly of positioned cell stacks and collectors in a single molding operation, the said insulating annular member of each cell stack serving to prevent penetration of said molding material during said molding operation into contact with respective of the positioned cell stacks.

* * * * *